United States Patent
Qaddoura et al.

(10) Patent No.: US 10,088,983 B1
(45) Date of Patent: Oct. 2, 2018

(54) MANAGEMENT OF CONTENT VERSIONS

(71) Applicant: Amazon Technologies, Inc., Seattle, WA (US)

(72) Inventors: Fareed Adib Qaddoura, Bellevue, WA (US); Thomas Bruno Mader, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 741 days.

(21) Appl. No.: 14/630,311

(22) Filed: Feb. 24, 2015

(51) Int. Cl.
*G06F 3/048* (2013.01)
*G06F 3/0484* (2013.01)

(52) U.S. Cl.
CPC .................. *G06F 3/0484* (2013.01)

(58) Field of Classification Search
CPC .. G06F 3/048; H04N 21/442; H04N 21/4402; H04N 21/44; H04N 21/4545; H04N 21/454
See application file for complete search history.

(56) References Cited

U.S. PATENT DOCUMENTS

| | | | | |
|---|---|---|---|---|
| 2008/0132187 A1* | 6/2008 | Hanebeck | ............ | G11B 27/105 455/186.1 |
| 2009/0313546 A1* | 12/2009 | Katpelly | ............ | H04N 7/17318 715/723 |
| 2013/0283162 A1* | 10/2013 | Aronsson | ............ | G11B 27/105 715/719 |
| 2016/0007065 A1* | 1/2016 | Peles | .................. | H04N 21/2668 725/14 |
| 2016/0066036 A1* | 3/2016 | Felt | .................... | H04N 21/4542 386/241 |
| 2017/0062006 A1* | 3/2017 | Plom | .................... | G11B 27/007 |

* cited by examiner

*Primary Examiner* — Rashawn N Tillery
(74) *Attorney, Agent, or Firm* — Kilpatrick Townsend & Stockton LLP

(57) ABSTRACT

In some examples, a content item may be modified in accordance with user preferences and provided to a user device for display. The user preferences may identify types of content that should be modified. Segments of the content item may be identified in accordance with the user settings. The identified segments may be modified and provided to the user device.

18 Claims, 10 Drawing Sheets

MANAGEMENT OF CONTENT VERSIONS

BACKGROUND

A user device may be enabled to stream or download a content item from a content server. The user device may include user settings that impact how the content is downloaded and played back or how a stream is received and played. In some examples, such user settings may include user settings directed to the content of the content item. These content-based user settings are typically binary in nature. For example, a ratings-based user setting may indicate that if the content item has a rating that falls within rating category (e.g., PG, PG-13, R, etc.), the content item may be played back on the user device. However, if the rating falls outside the rating category, the content item may not be played.

BRIEF DESCRIPTION OF THE DRAWINGS

Various embodiments in accordance with the present disclosure will be described with reference to the drawings, in which.

DETAILED DESCRIPTION

Figure 1:
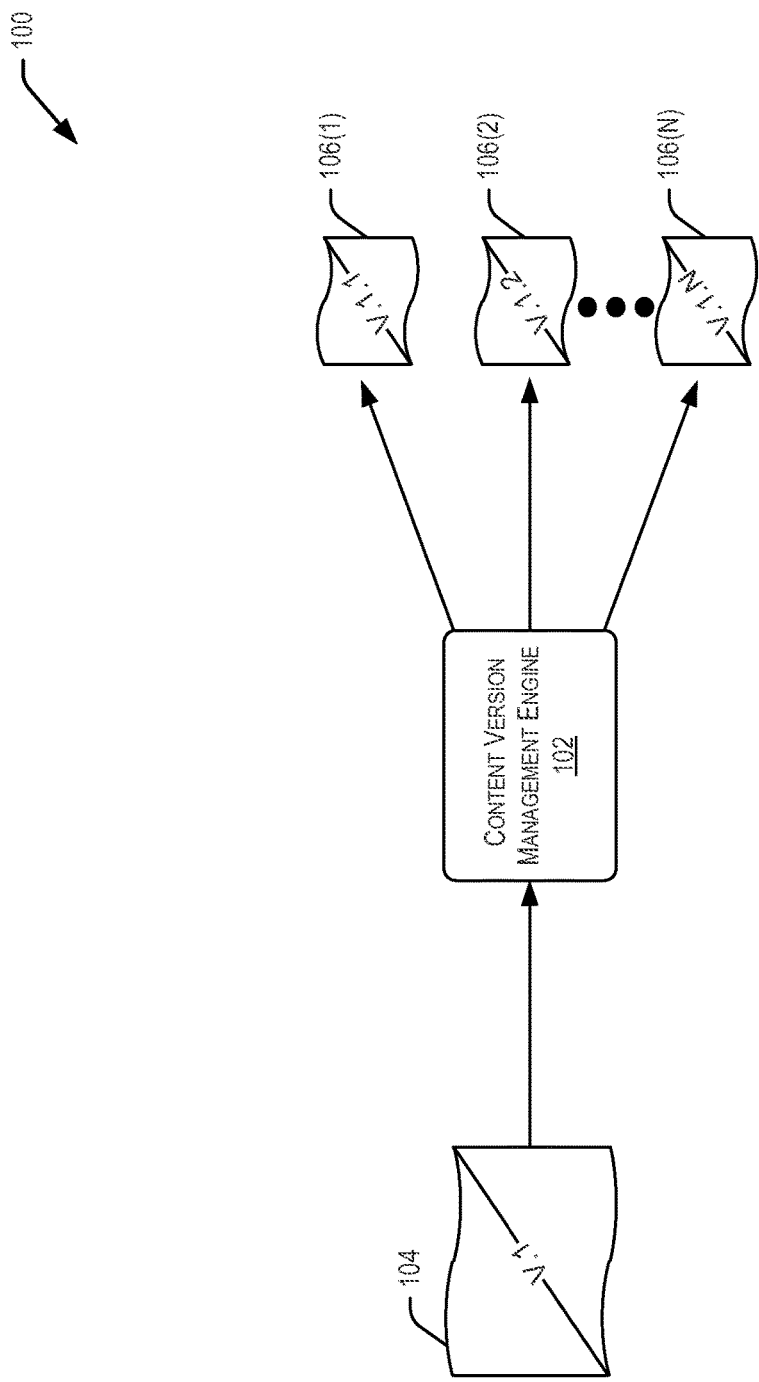
FIG. 1 is an example block diagram for implementing techniques relating to management of content versions as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present specification are directed to, among other things, techniques relating to management of content versions. In particular, techniques relating to the management of versions of content that may be provided by a content delivery service (e.g., directly to user devices or via a local host device). The content delivery service may be associated with an electronic marketplace and the content may be provided as part of a subscription service. In some examples, different content versions may be substantially simultaneously displayed on different user devices. Each different content version may be customized to each user device of each user. However, as would be apparent to one of ordinary skill in the art, the techniques described herein may be applicable to management of content versions in other contexts.

Turning now to a particular example, in this example, a content delivery service may enable streaming and downloading of different content items, including video files. A user of the content delivery services may use a computer or other user device to create a first set of user preferences associated with the user and a first user device. Some of the user preferences of the first set describe certain modifications that the user desires to be made to video files before the video files are viewed on the first user device. For example, the modifications may include removal of categories of objectionable content, compliance with an established rating category, removal of particular words or phrases, and/or certain user-identified modifications, which may be video file specific. The user may also create a second set of user preferences associated with a second user and a second user device. This may be because the second user device will be used by the first user's young child, for which certain portions of the video files may not appropriate. Thus, similar to the first set of user preferences, some of the user preferences of the second set may describe certain modifications that the user desires to be made to video files before the video files are viewed on the second user device by the second user. These modifications can be different from the modifications associated with the first set of user preferences. The user may then request that a video file be provided to the first user device and the second user device to watch substantially simultaneously together. The video file may be modified by the content delivery service and/or a local host device based on the first set of user preferences and the second set of user settings. Because the user preferences may be different, the video file may be modified to effectively create a first version (provided to the first user device) and a second version (provided to the second user device). The first user and the second user (e.g., the first user's child) may desire to watch the video file together. To this end, the first user device and the second user device may be connected to the same network as the local host device. The content delivery service and/or the local host device may then ensure that the timing of the first version and the second version is synced. In this manner, the first user and the second user can enjoy different versions of the same content item substantially simultaneously over the same network.

In some examples, more than one content version may be provided at the same time to different user devices which are located adjacent each other (e.g., in the same room). The content versions may be generated as the original content is modified in accordance with user preferences that may be specific to the user device on which the content version is being viewed and/or specific to the user viewing the content version. The user preferences may reflect modifications to the content that are to be made when content is played back.

The modifications may be based on cultural norms (e.g., modifying such that kissing is not displayed in movies to shown in certain countries), personal preferences (e.g., modifying such that certain words, phrases, or images are not displayed), established rating systems (e.g., modifying such that an R rated movie would comply with a PG-13 rating), categories (e.g., removal violence, sexual situations, explicit scenes, words and phrases, etc.) and any other distinction for modifying content. Because the user preferences may be different for each user and/or user device, particular content may be modified differently to effectively create different content versions. These modifications may be made on the fly as the users are viewing the particular content and/or may be made prior to the users requesting the content.

As indicated above, playback of the different content versions can be synced such that the different users can experience the particular content at the same time. To ensure that content versions remain synced, when a segment of content having a specific length is removed for a first content version, it may be replaced with a different segment of similar length. In this manner, the first content version may remain synced with a second content version from which the segment was not removed. Using the techniques described herein, segments of content may be adjusted without affecting the length of the segment. For example, words or images in the scene may be adjusted to comply with user preferences. This may include inserting a different word, replacing an image including prohibited content with allowable content, and the like.

Turning now to the figures, FIG. 1 illustrates an example block diagram depicting environment 100 for implementing techniques relating to management of content versions as described herein. In particular, the environment 100 may illustrate a creation and distribution system for managing content versions. To this end, the environment 100 may include a content version management engine 102. As described herein, the content version management engine 102 may be embodied in a content server, a host device, or distributed between the content server and the host device. Generally, the content version management engine 102 may be configured to implement the techniques described herein. For example, the content version management engine 102 may receive a content item 104. The content item 104 may be any suitable electronic content item including, for example, an audio track, a video file, an audiobook, an image file, a video game file, and/or any other electronic content item capable of being provided to a user device, any of which or none of which may be streamable.

The content version management engine 102 may be configured to modify the content item 104 to generate one or more content versions 106(1)-104(N) of the content item 104. In some examples, each content version of the content versions 106(1)-106(N) may be distinct from the others in at least one respect. For example, when the content item 104 is a video file, the content version 106(1) may include a first segment of the video file that is different from a corresponding second segment of the video file from the content version 106(2). This may because the second segment has been modified to remove certain graphic content that is included in the first segment. In any event, the content version management engine 102 may enable playback of the different content versions 106(1)-106(N) on different user devices at substantially the same time (e.g., substantially simultaneously). In some examples, content versions played back at substantially the same time may mean that differences between the content versions are imperceptible to a human user In some examples, each content version of the content versions 106(1)-106(N) may be the same. For example, if the user settings are the same for each user device and/or user. In some examples, at least some of the content versions of the content versions 106(1)-106(N) are the same and at least some are distinct. For example, for a family of three, two versions (e.g., 106(1) and 106(2)) may be the same and provided to the two parents, while a third version (e.g., 106(3)) may include some modifications and be provided to a child.

Depending on the particular implementation, the content version management engine 102 may be utilized to generate indicators. These indicators may be referenced prior to the content version management engine 102 generating the content versions 106(1)-106(N) (e.g., modify the content item 104), generating the content versions 106(1)-106(N) in a pre-computed manner, generating the content versions 106(1)-106(N) in as-needed manner, or generating the content versions 106(1)-106(N) and/or assisting in the generation of the content versions 106(1)-106(N) in any other suitable manner.

Figure 2:
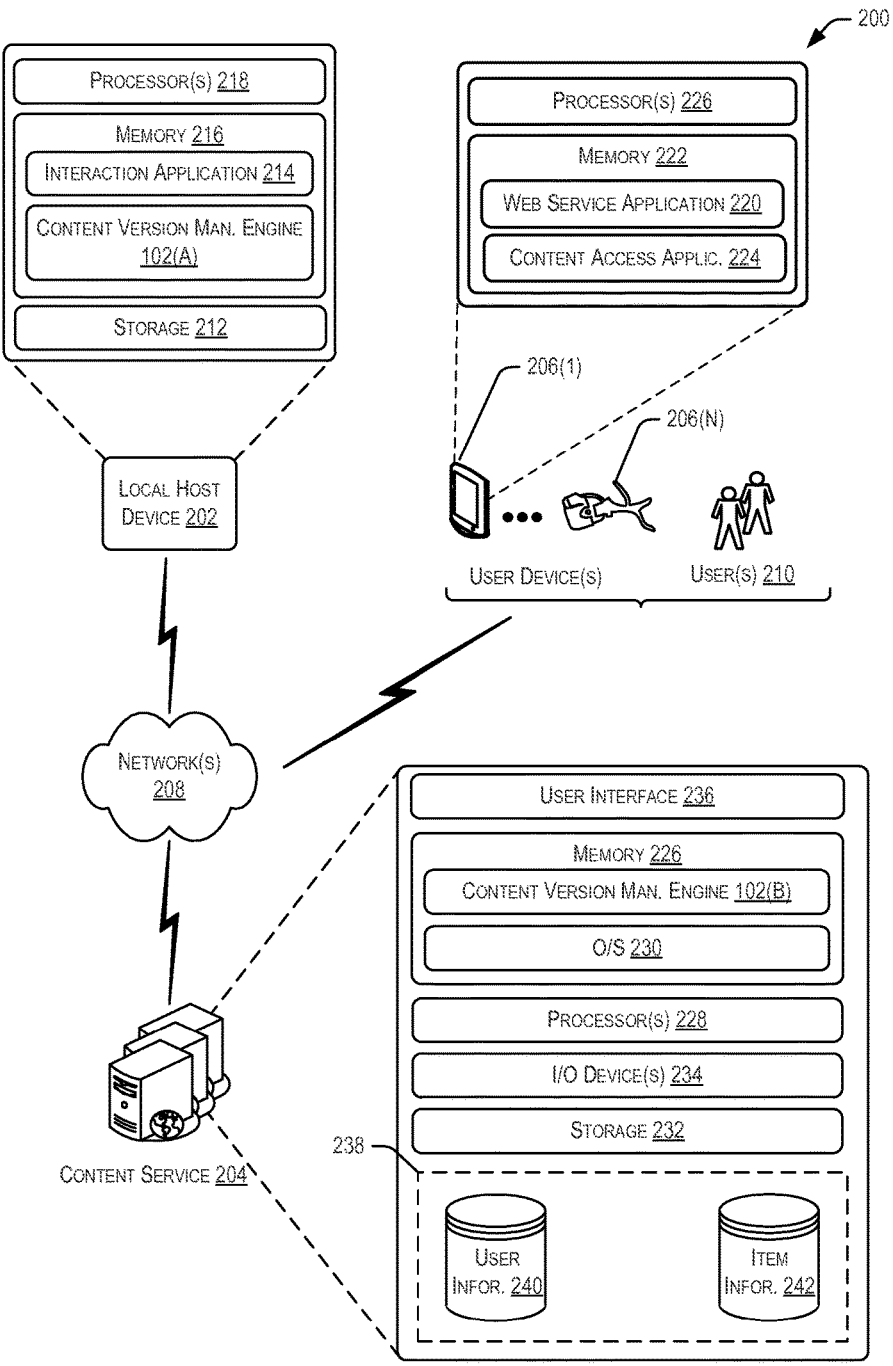
FIG. 2 is an example schematic architecture for implementing techniques relating to management of content versions as described herein, according to at least one example.

In FIG. 2 is illustrated an example architecture 200 for implementing techniques relating to management of content versions as described herein. The architecture 200 may include a local host device 202 in communication with a content service 204 and one or more user devices 206(1)-206(N) (hereinafter, "the user device 206") via one or more networks 208 (hereinafter, "the network 208"). The user device 206 may be operable by one or more users 210 (hereinafter, "the user 210") to interact with the content service 204 and/or the local host device 202. In some examples, the user device 206 is in network communication with the local host device 202 via a second network (not show) and/or a wired connection, both of which may be distinct from the network 208.

Turning now to the details of the local host device 202, the local host device 202 may be a network-enabled computing device configured to at least provide electronic content items to the user device 206. In some examples, the electronic content items are streamed from the content service 204 via the network 208 and the local host device 202 to the user device 206 as distinct content items. The electronic content items may also be downloaded to the local host device 202 and stored by the local host device 202. To this end, the local host device 202 may include storage 212. The storage 212 may be configured to at least store at least the electronic content items. The local host device 202 may also include an interaction application 214 and the content version management engine 102(A) within memory 216. The storage 212 and the memory 216 may each be removable and may be volatile (such as random access memory (RAM)) and/or non-volatile (such as read-only memory (ROM), flash memory, or other memory).

The interaction application 214 may be configured to enable the users 210, whether via the user device 206 or by directly interacting with the local host device 202 (e.g., by using a remote), to control the operation of the local host device 202. For example, the interaction application 214 may include one or more menus displaying electronic content items that are accessible via the content service 204. The interaction application 214 may also include a menu devoted to configuration settings for the local host device 202 and other applications to enable streaming and/or downloading of electronic content items. Thus, the memory 216 of the local host device 202 may store program instructions that are loadable and executable on processor(s) 218, as well as data generated during the execution of these programs. The processor 218 may be implemented as appropriate in hardware, computer-executable instructions, software, firmware, or combinations thereof. Computer-executable instructions, software or firmware implementations of the processor 218 may include computer-executable or machine-executable instructions written in any suitable programming language to perform the various functions described.

The content version management engine 102(A) may be configured to perform one or more operations on electronic content items that are provided by the content service 204 via the network 208. For example, the content version management engine 102(A) may be configured to identify, within a stream of electronic content including an electronic content item, a segment of the electronic content item to adjust. Once identified the content version management engine 102(A) may modify the segment in accordance with one or more user preferences associated with the user 210 and/or the user device 206 prior to providing the segment to the user device 206.

As noted above, the architecture 200 may include the user device 206. The user device 206 may be any suitable type of computing device such as, but not limited to, a wearable device, a tablet, a mobile phone, a smart phone, a personal digital assistant (PDA), a laptop computer, a desktop computer, a thin-client device, a tablet computer, a high-definition television, a web-enabled high-definition television, a set-top box, etc. For example, the user device 206(1) is illustrated as an example of a smart phone, while the user device 206(N) is illustrated as an example of a wearable device.

The user device 206 may include a web service application 220 within memory 222. The web service application 220 may allow the user 210 to interact with the content service 204 via the network 208. Such interactions may include, for example, creating, updating, and managing user preferences associated with the user 210 and/or any one of the user devices 206, identifying segments of particular electronic content items to be modified during playback, updating lists of prohibited aspects (e.g., words, phrases, themes, objects, situations, and other aspects of content) of all or particular electronic content items, selecting predetermined categories (e.g., acceptable ratings) applicable to electronic content items during playback, selecting electronic content items to view, and performing any other suitable interaction. In some examples, the user 210 uses the user device 206 to access the content version management engine 102(A) to perform the interactions indicated above. In any event, the content service 204 may host the web service application 220.

The described techniques can similarly be implemented outside of the web service application 220, such as with other applications running on the user device 206. For example, the user device 206 may include a content access application 224. The content access application 224 may be utilized by the user 210 when viewing and/or interacting with the electronic content items (e.g., in association with the content version management engine 102(A) or the content version management engine 102(B)). For example, the content access application 224 may enable the user device 206 to connect to the local host device 202 to receive electronic content items. In some examples, the local host device 202 is configured to support unique connections with the user devices 206(1)-206(N). In some examples, the memory 222 of the user device 206 may also include a content version management engine 102(C). The content version management engine 102(C) may be configured to perform functions similar to those described with reference to other content version management engines 102(A), 102(B) described herein. For example, the content version management engine 102(C) may be configured to receive a content item from a third-party content delivery service and apply modifications to the content item in accordance with user preferences. In this manner, the user device 206 via the content version management engine 102(C) may analyze the content item.

In the memory 222 of the user device 206 may be stored program instructions that are loadable and executable on processor(s) 226, as well as data generated during the execution of these programs. Depending on the configuration and type of user device 206, the memory 222 may be volatile (such as random access memory (RAM)) and/or non-volatile (such as read-only memory (ROM), flash memory, etc.).

Turning now to the details of the content service 204, the content service 204 may include one or more service provider computers, perhaps arranged in a cluster of servers or as a server farm, and may host web service applications. These servers may be configured to host a website (or combination of websites) viewable on the user device 206. The content service 204 also may be implemented as part of an electronic marketplace (not shown). In some examples, the content service 204 may be configured to provide electronic content items to the local host device 202 and/or the user devices 206. In some examples, the electronic content items are modified prior to be being provided to the local host device 202. In some examples, the electronic content items are modified after being provided to the local host device 202.

The content service 204 may include at least one memory 226 and one or more processing units (or processor(s)) 228. The processor 228 may be implemented as appropriate in hardware, computer-executable instructions, software, firmware, or combinations thereof. Computer-executable instruction, software, or firmware implementations of the processor 228 may include computer-executable or machine-executable instructions written in any suitable programming language to perform the various functions described. The memory 226 may include more than one memory and may be distributed throughout the content service 204. The memory 226 may store program instructions that are loadable and executable on the processor(s) 228, as well as data generated during the execution of these programs. Depending on the configuration and type of memory including the content service 204, the memory 226 may be volatile (such as random access memory (RAM)) and/or non-volatile (such as read-only memory (ROM), flash memory, or other memory). The memory 226 may include an operating system 230 and one or more application programs, modules, or services for implementing the features disclosed herein including at least the content version management engine 102(B).

The content service 204 may also include additional storage 232, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 232, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the content service 204.

The content service 204 may also include input/output (I/O) device(s) and/or ports 234, such as for enabling connection with a keyboard, a mouse, a pen, a voice input device, a touch input device, a display, speakers, a printer, or other I/O device.

In some examples, the content service 204 may also include a user interface 236. The user interface 236 may be utilized by an operator, curator, or other authorized user to access portions of the content service 204. In some examples, the user interface 236 may include a graphical user interface, web-based applications, programmatic interfaces such as application programming interfaces (APIs), or other user interface configurations. The content service 204 may also include a data store 238. In some examples, the data store 238 may include one or more databases, data structures, or the like for storing and/or retaining information associated with the content service 204. Thus, the data store 238 may include data structures, such as a user information data store 240 and an electronic content item data store 242.

The user information data store 240 may be used to retain information pertaining to users of the content service 204 such as the user 210. Such information may include, for example, user preferences, user account information (e.g., electronic profiles for individual users), demographic information for users, payment instrument information for users (e.g., credit card, debit cards, bank account information, and other similar payment processing instruments), account preferences for users, purchase history of users, wish-lists of users, search histories for users, and other similar information pertaining to a particular user, and sets of users, of the content service 204.

In some examples, the user preferences stored in the user information data store 240 may be specific to particular user devices, to particular users, or to any combination of the foregoing. For example, the user 210 may be associated with a plurality of user devices of the user devices 206(1)-206(N). In this example, the user 210 may be a master user and may create specific user preferences for each of the plurality of user devices 206 such that each of the plurality of user devices 206 are operable in accordance with its respective user preferences, which may be identified based on a user profile of the user 210. In this manner, the user preference may be fixed to the user device 206, irrespective of which user is accessing the user device 206. In some examples, the user 210 may set up master user preferences, which may be the default user preference when a new user device is associated with the user. This configuration for managing user preferences may be desirable when the master user is a parent and at least some of the user devices 206 that are associated with the master user are used by children of the master user.

In some examples, each of the users 210 may have their own user preferences (e.g., as part of a user profile) that may be portable between any of the user devices 206. Such user preferences may be associated with a particular user device 206 after the user 210 logs in to the user device 206 (e.g., logs into the content access application 224) using user credentials. This configuration for managing user preferences may be desirable when each of the users 210 is capable of managing its own user preferences.

The electronic content item data store 242 may include an expansive collection of electronic items (e.g., music, movies, videos, television shows, audiobooks, and other similar electronic content items) available for purchase, rental, and/or available on a subscription basis. The electronic content item data store 242 may be searchable by the user 210 via the interaction application 214 of the local host device 202, the content access application 224, or the web service application 220.

In some examples, the electronic content item data store 242 may include added details about each electronic content item. For example, the added details may include graphical information (e.g., pictures, photographs, etc.), user comments, and reviews relating to items, historical purchase information for items, predicted purchase information for items, subscription-related information for items, and other details about items. This information may be presented to the users 210 at different points in time to influence or drive subscription and purchase services. In some examples, the electronic content item data store 242 may include individual content versions stored in association with the electronic content items. For example, a first content version may correspond to a version of a film with an "R" rating, while a second content version may correspond a version of the film with a "PG-13" rating. In some examples, a curator selects the content to be included or excluded from a particular version prior to the particular version being saved in the electronic content item data store 242.

Figure 3:
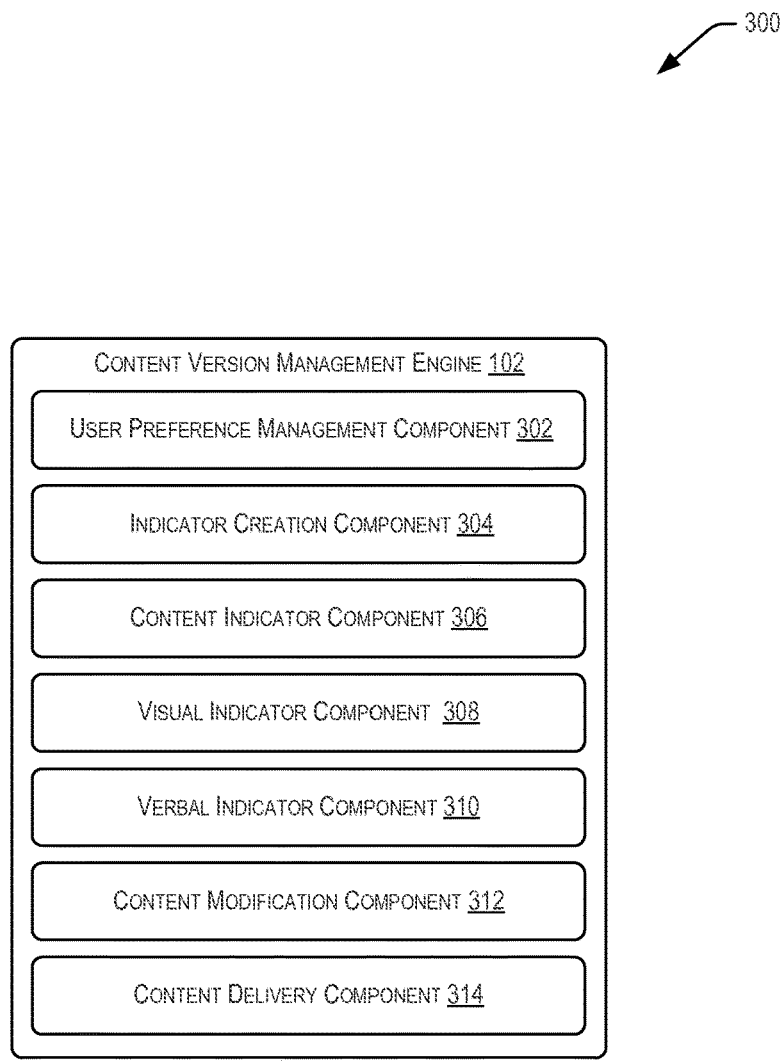
FIG. 3 is an example device for implementing techniques relating to management of content versions as described herein, according to at least one example.

In FIG. 3 is illustrated example device 300 including the content version management engine 102. The content version management engine 102 may be configured to manage one or more sub-modules, components, and/or services directed to examples disclosed herein. In some examples, the content version management engine 102 may include a user preference management component 302, an indicator creation component 304, a content indicator component 306, a visual indicator component 308, a verbal indicator component 310, a content modification component 312, and a content delivery component 314. While these modules and components are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other module, components, or engines may perform the same tasks as the content version management engine 102 or other tasks and may be implemented in a similar or different fashion.

The user preference management component 302 may be configured to enable a user to create, revise, save, share, and otherwise manage its user preferences. For example, as described herein, a user may create its own user preferences. These user preferences may be accessed by other components described herein to determine how to modify content when providing the content to a user device. In some examples, the user preference management component 302 may be used to provide a plurality of generic user preferences for the user. The generic user preferences may indicate generic modifications that can be made to content items before they are viewed. For example, the generic modifications may correspond to one or more established rating systems (e.g., the Motion Picture Association of America's (MPAA) film-rating system (e.g., G rated, PG rated, PG-13 rated, R rated, NC-17 rated. Green advertisement rated. Yellow advertisement rated, and Red advertisement rated) or the TV Parental Guidelines (e.g., TV-Y, TV-Y7, TV-G, TV-PG, TV-14, and TV-MA) or one or more established content descriptors (e.g., D—suggestive dialogue, L—coarse language, S—sexual content, V—violence, and FV—fantasy violence). For example, a user preference may include a modification that all content watched on a particular user device comply with the TV-PG rating. Using the techniques described herein, when the particular user device requests to watch TV-MA content, another component of the content version management engine 102 may adjust the content (in accordance with the user preference) to comply with the TV-PG rating.

In some examples, the user preferences are created in accordance with one or more community-based preferences. For example, users may be polled, preferences analyzed, and/or viewing habits may be monitored to determine how users typically manage their settings. In some examples, the community-based preferences may identify modifications made to certain content items by members of the community. In this manner, a user may manage its own user preferences after receiving suggestions of what other users have done.

In some examples, users may be enabled to make suggestions of modifications. For example, a user may desire that an alternate scene be made to replace a certain scene in a movie. The suggestion may be provided to the movie studio that created the film or any other user capable of creating the alternate scene.

In some examples, the user preferences correspond to aspects of a video game. For example, user preferences may be directed to a skill level of the user, an age of the user, an experience level of the user, and the like. The content item may be a multiplayer video game and the content versions may be modified versions of the multiplayer video game. For example, two users may play the same multiplayer video game substantially simultaneously, while using different user devices over the same or a different network. In any event, the first user using a first user device may play the multiplayer video game at a first difficulty level based on a first user setting, while a second user using a second user device may play the same multiplayer video game at a second difficulty level based on a second user setting. The design of the video game may enable the two users may interact with each other within an environment of the multiplayer video game. However, the content of the environment that each of the two users views (and interacts within) may be different based on the user settings. In other words, different versions of the environment may be provided to the different users.

The indicator creation component 304 may be configured to enable a curator or other authorized user, which may be the user 210, to perform one or more operations on content items to enable other components of the content version management engine 102 to modify the content items. For example, the one or more operations may involve associating one or more content indicators with different scenes of a content item. The content indicators may essentially flag certain scenes in the content item that may be modified. The curator may be associated with a film studio and input the indicators prior to release of a film. The curator may also be an authorized user associated with the content service 204 and may input the indicators after the film has been released. The curator may also be the user 210 and may input the indicators after the film has been released and in a manner that creates a user-customized film.

In the example when the curator is associated with a film studio, as the curator is editing the film prior its release, the curator, using the indicator creation component 304, may essentially flag certain scenes in the film that can be modified by associating a content indicator with the scene. A content indicator may be stored in association with a video file of the film and/or may be saved to an associated file. In any event, the content indicator may include text describing the timing of the scene and a few details about the scene. For example, a content indicator (with or without an associated file) may indicate that at 0 h, 32 m, 45 s a violent sequence begins and runs for 1 m, 32 s. The content indicator may also include details (with or without an associated file) about the violent sequence. For example, the details may include what types of violence are in the sequence (e.g., domestic, gang-related, historical, fictional, fantastical, war-related, against certain minority groups, torture, etc.) whether weapons are used and, if so, what types, whether blood and gore is shown, and any other relevant details about the sequence. In some examples, the curator also identifies alternate scenes to replace the identified scene. Thus, in the violent sequence example, the curator may identify one or more alternate sequences of equal length (e.g., 1 m, 32 s) to play in place of the violent sequence. The video file and associated file and alternate scenes may be saved in the electronic content item data store 242.

The content indicator component 306 may be configured to analyze content items to identify content indicators. For example, the content indicator component 306 may scan a particular content item to identify content indicators input using the indicator creation component 304 and associated with the particular content item. In this manner, the content indicator component 306 may be configured to determine when content is to be modified. In some examples, the content indicator component 306 may be configured to analyze content items in connection with the content item being delivered to a user device and the modifications may be made on-the-fly by the content modification component 312. In some examples, the content indicator component 306 may be configured to analyze content items prior to the content items being requested by a user device. In this example, content versions of the content items may be generated prior to the user device requesting the content versions.

The visual indicator component 308 may be configured to analyze content items to identify visual indicators in the content items. In some examples, visual indicators may be images or scenes within one or more frames of the content items. For example, a visual indicator may be a scene of two people kissing (i.e., one or more "still images" of two people kissing,) a word displayed on a park bench in a scene, and any other visual aspect of a content item. The visual indicator component 308 may be configured to analyze a content item to identify the image of the two people kissing. If the image is found, the visual indicator component 308 may inform the content modification component 312 and an appropriate modification may be made. In some examples, the visual indicator component 308 searches for images in accordance with user preferences. For example, a user may select a set of images from a set of stock images depicting certain objects, scenes, and the like and associate the selected set of images with a user preference. The visual indicator component 308 may then search for image in content items that match the set of images. In some examples, the user may select a set of images that corresponds to scenes in a particular content item. For example, the user may be familiar with scenes in the particular content item and may select images from those scenes to associate with a user preference. In any event, the visual indicator component 308 may be configured to perform one or more image processing techniques to identify (e.g., image objects)

visual indicators. Such techniques may include any suitable appearance-based methods (e.g., edge detection, divide-and-conquer, greyscale matching, gradient matching, histograms of receptive field responses, model-based techniques, etc.), feature-based methods (e.g., interpretation trees, hypothesis tests, pose consistency, pose clustering, invariance, geometric hashing, scale-invariant feature transform, speeded up robust features, etc.), and any other suitable technique for identifying image objects in images (e.g., frames of content items). In some examples, the visual indicator component 308 analyzes a text portion (e.g., a script of a movie) of a content item to identify words or phrases that may correspond to user preferences.

The verbal indicator component 310 may be configured to analyze content items to identify verbal indicators in the content items. The verbal indicators may include one or more words or phrases recognized in the content items. For example, a user preference may indicate a "blacklist" of words to remove from content items. The verbal indicator component 310 may analyze a content item to identify words that are on the "blacklist." For example, the verbal indicator component 310 may analyze an audio track of a content item (e.g., a movie) to identify verbal indicators (e.g., words or phrases on the blacklist). Once identified, the content modification component 312 may be configured to modify the content item to remove, replace, or adjust the identified words or phrases. In some examples, the verbal indicator component 310 may analyze an audio stream, audio track, or the like to identify sounds that may be modified in accordance with a user preference. For example, a user preference may indicate that sirens (e.g., police, ambulance, fire, etc.) and gunshots be revised (e.g., reduce the volume), removed (e.g., blanked out), or replaced (e.g., removed and replaced with an appropriate sound, which may or may not be user-defined (e.g., an infant's giggle). Thus, the verbal indicator component 310 may be configured to identify verbal indicators using one or more speech recognition techniques. Suitable techniques may include, for example, natural language processing (NLP) using machine learning, Hidden Markov models, Dynamic time warping (DTW), neural networks, deep neural networks and other deep learning models, and any other suitable technique for identifying verbal indicators from spoken text and/or written text.

The content modification component 312 may be configured to modify aspects of content items in accordance with user preferences. As described herein, the aspects may be identified using one of the other components of the content version management engine 102, and the content modification component 312 may modify based on the aspects identified. Modification may include removing a segment of a content item and replacing it with a curator-defined alternate segment, removing a segment of a content item and replacing it with user defined alternate segment, removing a segment of a content item and replacing it with an unrelated segment (e.g., an advertisement, short video, trailer for movie, etc.), removing a segment of a content item and not providing an alternate segment, removing or adjusting verbal or visual aspects of a segment of a content item, and any other suitable modification. Once the modification is made, the content delivery component 314 may deliver the content item (or modified segment) to a requesting user device. In some examples, one or more segments (e.g., four one-minute long segment) may be coupled together and replaced with a longer alternate segment (e.g., one four-minute long segment) at an appropriate time.

In some examples, alternate segments or alternate portions may include adjustments to the characteristics of the content item, other than the content itself. For example, an alternate segment may include providing a modified audio track throughout at least a portion of a movie. This may be desirable for a user that is hearing impaired. In some examples, certain portions of the audio track may be modified. For example, the volume of background sounds may be lowered, while the volume of dialogue may be increased. In some examples, user preferences may indicate that such modifications be made to the content item.

The content delivery component 314 may be configured to provide content items, whether modified or not, to one or more user devices. Thus, the content delivery component 314 may be configured to establish a connection with the one or more user devices in response to a request from at least one user device. The content delivery component 314 may then manage the delivery of content versions to the one or more user devices and manages similar playback. In some examples, the content delivery component 314 enables downloading of the content versions to a local host device and/or directly to the one or more user devices. In some examples, the content delivery component 314 enables streaming of the content versions to the local host device and/or directly to the one or more user devices for substantially simultaneous playback.

In some examples, data sets including content items may be analyzed to determine what types of content result in content items have particular ratings. For example, for each content item that has a rating, a description of each type of content may be included (e.g., description of violence, description of sexual situations, description of language, description of themes, and any other type of content item used to determine a rating). Based on this information, it may be determined how to adjust other content items to reduce or increase the current rating. For example, if it is determined that R rated movies typically have at least 3 uses of a particular expletive, future versions may be adjusted to remove other uses of the particular expletive to fall below 3. Thus, the data sets may enable generation of one or more thresholds according to which other content items may be adjusted. In some examples, using the techniques described herein and the information derived from the data sets, a rating may be given to a new content item automatically. For example, the content of a new movie may be analyzed using the content indicator component 306, the verbal indicator component 308, and/or the verbal indicator component 310 to identify the types of content and the substance of the types for the new movie. The types and substance may then be compared to one or more thresholds to determine a rating.

Figure 4:
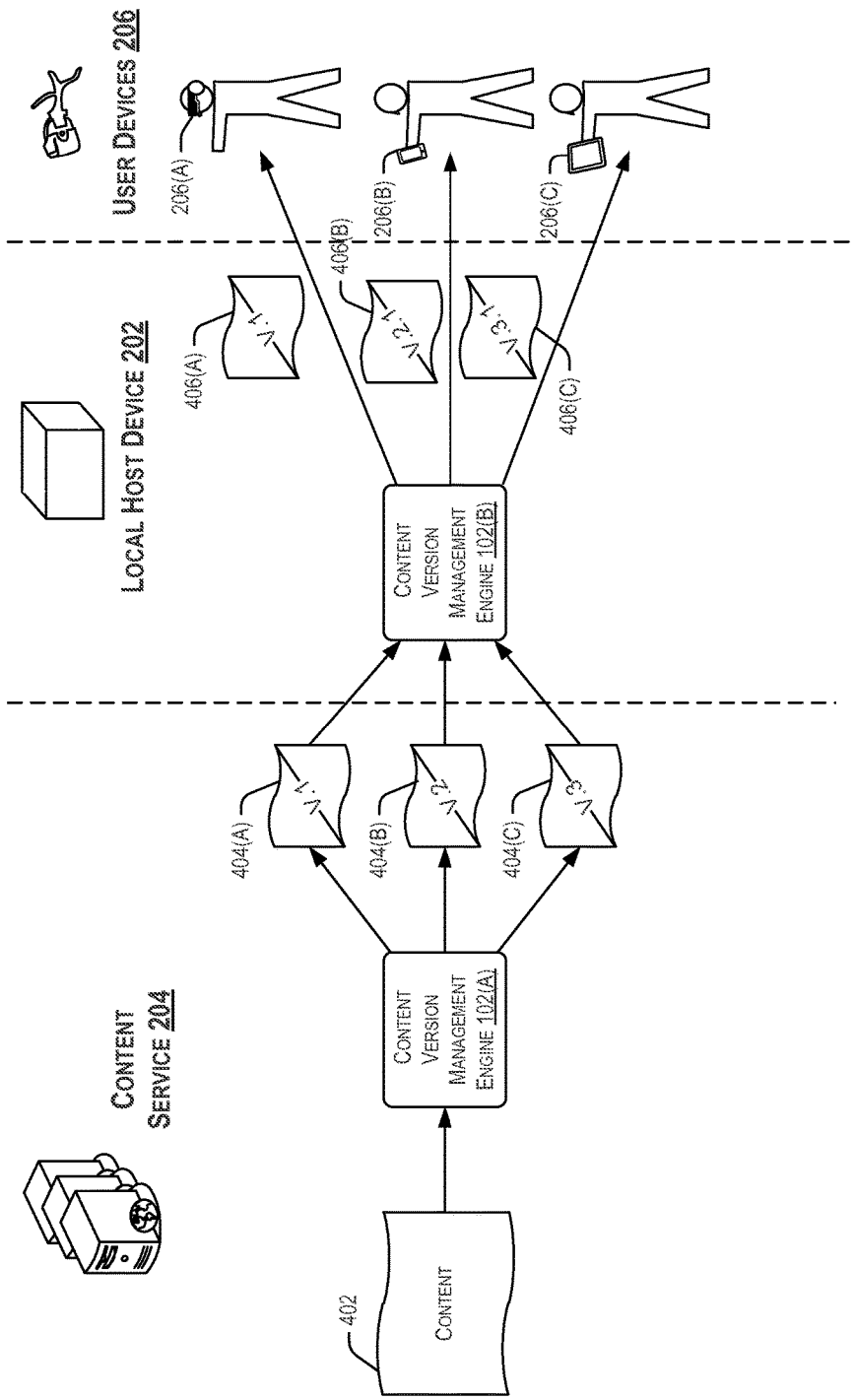
FIG. 4 is an example pipeline depicting techniques relating to management of content versions as described herein, according to at least one example.

Turning now to FIG. 4, in this figure is illustrated an example pipeline 400 depicting techniques relating to management of content versions as described herein. The pipeline 400 may include the content service 204 (and the content version management engine 102(A)), the local host device 202 (and the content version management engine 102(B)), and the user devices 206 each divided into respective areas. In some examples, the different areas may correspond to which component of the pipeline 400 is performing certain actions. It is understood, however, that FIG. 4 illustrates an example configuration for management of content versions and, in some examples, other components perform actions other than, or differently from, the actions described with reference to the pipeline 400.

In the content service 204 area, the content version management engine 102(A) receives content item 402. The content item 402 (e.g., the content item 104) may correspond to an original content item which has not been modified. In some examples, a curator uses the content version management engine 102(A) to create content versions 404(A)-404(C) (e.g., the content versions 106(1)-106(N)). The content version 404(A) may be a first version of the content item 402. In some examples, the content version 404(A) may be the content item 402. In some examples, the content versions 404(B) and 404(C) may be respectively second and third versions of the content item 402. The different versions may correspond to categories of a rating system which are available to the user devices 206(A)-206(C). For example, the content version 404(A) may be the same as the content 402 and have an R rating. The content version 404(B) may include modified content such that it would have a PG-13 rating. Similarly, the content version 404(C) may include other modified content such that it would have a PG rating. In some examples, the content versions 404(A)-404(C) may be suitably modified such that the three content versions may be viewed substantially simultaneously on three different user devices 206, without sacrificing the flow of content item 402 (e.g., the flow of the story, of the song, of the game, etc.). Thus, each of the user devices 206(A)-206(C) may interact with the content version management engine 102(A) to select one of the content versions 404(A)-404(C) for display on each of the user devices 206(A)-206(C). In some examples, the user device 206(A) may interact to identify which of the content versions 404(A)-404(C) to provide to which of the user devices 206(A)-206(C).

In some examples, one or more of the content versions 404(A)-404(C) may be provided directly to the user devices 206(A)-206(C) without going through the local host device 202. In some examples, one or more of the content versions 404(A)-404(C) may be provided to the user devices 206(A)-206(C) without the local host device 202 performing additional modifications (e.g., not modifying the content versions 404(A)-404(C) to create modified content versions 406(A)-406(C)). In some examples, however, one or more of the content versions 404(A)-404(C) may be provided to the user devices 206(A)-206(C) after the local host device 202 performs additional modifications (i.e., using the content version management engine 102(B)) to the content versions 404(A)-404(C) to create the modified content versions 406(A)-406(C). In some examples, at least a portion of the modifications made to the modified content versions 406(A)-406(C) are performed by the content version management engine 102(A).

The modified content versions 406(A)-406(C) may be created as the content version management engine 102(B) or 102(A) accesses user preferences (e.g., in memory of the local host device 202, received from the content service 204, or received from at least one user device 206) associated with each of the user devices 206(A)-206(C) and/or with each user of the user devices 206(A)-206(C), identifies content to modify, and modifies the identified content in accordance with the user preferences. In some examples, each of the modified content versions 406(A)-406(C) may be distinct; however, in other examples, any number of the versions may be distinct or the same as others. For example, the modified content version 406(A) may correspond to a first version of the content item 402, which may be the original version of the content item 402. Similarly, the modified content version 406(B) may correspond to a first modified version of the second content version (e.g., 404(B)) and the modified content version 406(C) may correspond to a first modified version of the third content version (e.g., 404(C)). In this manner, content versions may be selected based on user preferences (e.g., the content versions 404(A)-404(C)) and modified based on user preferences (e.g., the modified content versions 406(A)-406(C)).

The content version management engine 102(B) may then be used to provide the modified content versions 406(A)-406(C) to the respective user devices 206(A)-206(C). The user devices 206(A)-206(C) may be any suitable user device as described herein. In the pipeline 400, the user device 206(A) may be a wearable user device, the user device 206(B) may be a smartphone, and the user device 206(C) may be a tablet device.

In some examples, the content version management engine 102(B) may receive an unaltered version of the content item 402. In some examples, the modified content version 406(A) may be an unaltered version of the content item 402. In some examples, the content item 402 may be received directly by the content version management engine 102(B), instead of via the content version management engine 102(A). The content version management engine 102(B) may also receive altered segments in connection with the unaltered version. In some examples, the segments may correspond to certain unaltered segments in the unaltered version. The altered segments may be used by the content version management engine 102(B) to alter the unaltered version. In this manner, the content version management engine 102(B) may generate a content version of the content item 402 (e.g., the modified content version 406(A)) without interacting with the content version management engine 102(A). This may be because the content version management engine 102(B) may have access to the unaltered version and the altered segments needed to generate a content version of the content item 402. In some examples, the altered segments may be requested by the content version management engine 102(B) only slightly (e.g., a few minutes) before they are needed by the content version management engine 102(B) to modify the unaltered version. In some examples, the content version management engine 102(B) may scan forward in the unaltered version (e.g., ahead of live playback on one of the user devices 206) to determine when modifications may be needed. Once it is determined that a modification may be needed, the content version management engine 102(B) may request that altered segments be provided. In some examples, the content service 204, whether acting through the content version management engine 102(A) or otherwise, may fulfill such requests.

In some examples, at least the local host device 202 and the user devices 206(A)-206(C) may be in communication with each other over the same network. Thus, using the techniques described herein, the users of the user devices 206(A)-206(C) may experience their respective versions (e.g., the modified content versions 406(A)-406(C)) of the content item 402 at substantially the same time. This may mean that the modified content versions 406(A)-406(C) begin at substantially the same time, end at substantially the same time, and that the timing of major moments that may evoke a response (e.g., comical scenes, thriller scenes, scary scenes, etc.) in the modified content versions 406(A)-406(C) correspond to each other. In this manner, the users of the user devices 206(A)-206(C) may be less aware that they are experiencing different versions of the content item 402 because their outward responses and expressions may be more or less synced.

Figure 5:
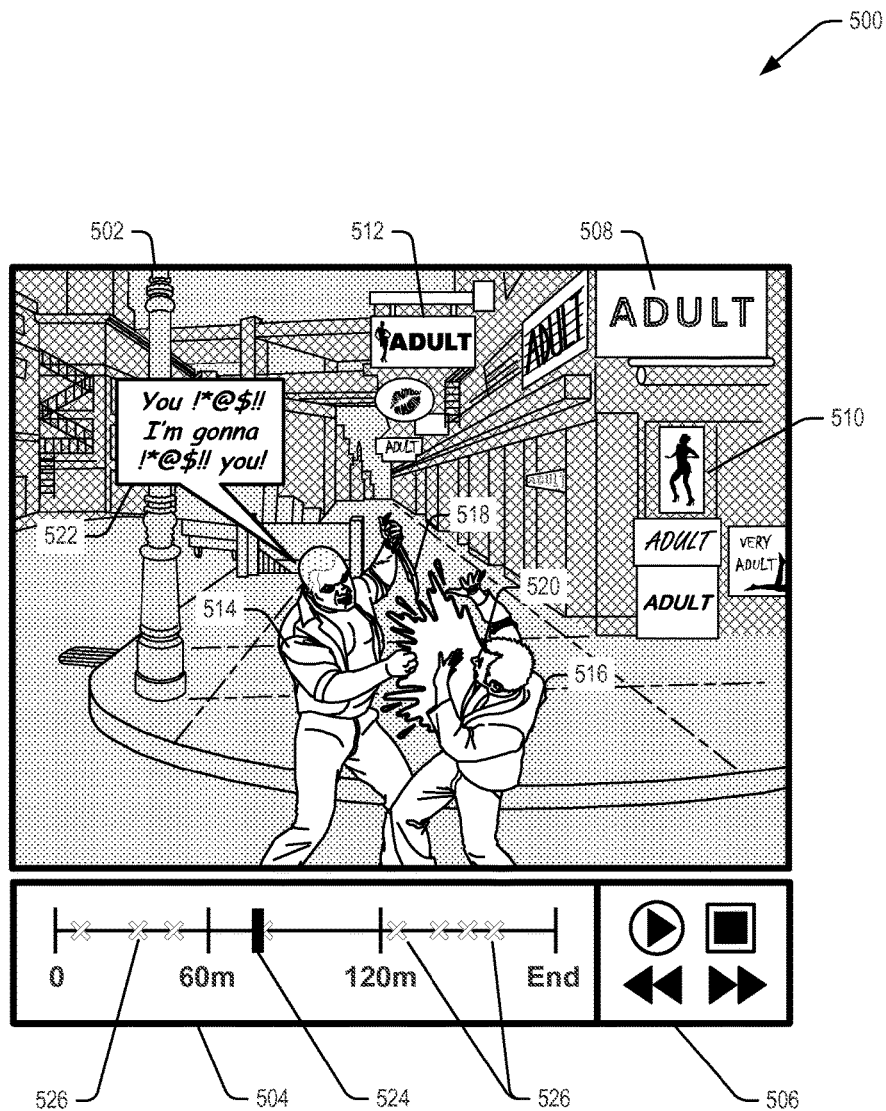
FIG. 5 is an example user interface depicting techniques relating to management of content versions as described herein, according to at least one example.

Turning now to FIG. 5, in this figure is illustrated an example user interface 500 for implementing techniques relating to management of content versions as described herein. The user interface 500 may include a display portion 502, a timeline portion 504, and a playback control portion 506. In some examples, the display portion 502 may be configured to display content items (e.g., audio and video files). Currently, the display portion 502 includes a scene of a movie (e.g., a video file that is a content item). The displayed scene may include a single frame of the movie. In the scene, two men 514, 516 are located in what appears to be a red-light district. This may be determined by analyzing the scene (e.g., one or more frames) to identify the many signs advertising adult-related services. For example, a text sign 508 includes the word "ADULT," while a graphic sign 510 includes a graphic of a dancing woman, and a combined sign 512 includes a graphic of a dancing woman combined with text. Thus, the analyzing may be configured to recognize text content (e.g., the text sign 508) in the scene and graphical content (e.g., the graphic sign 510 and the combined sign 512) in the scene.

Figure 6:
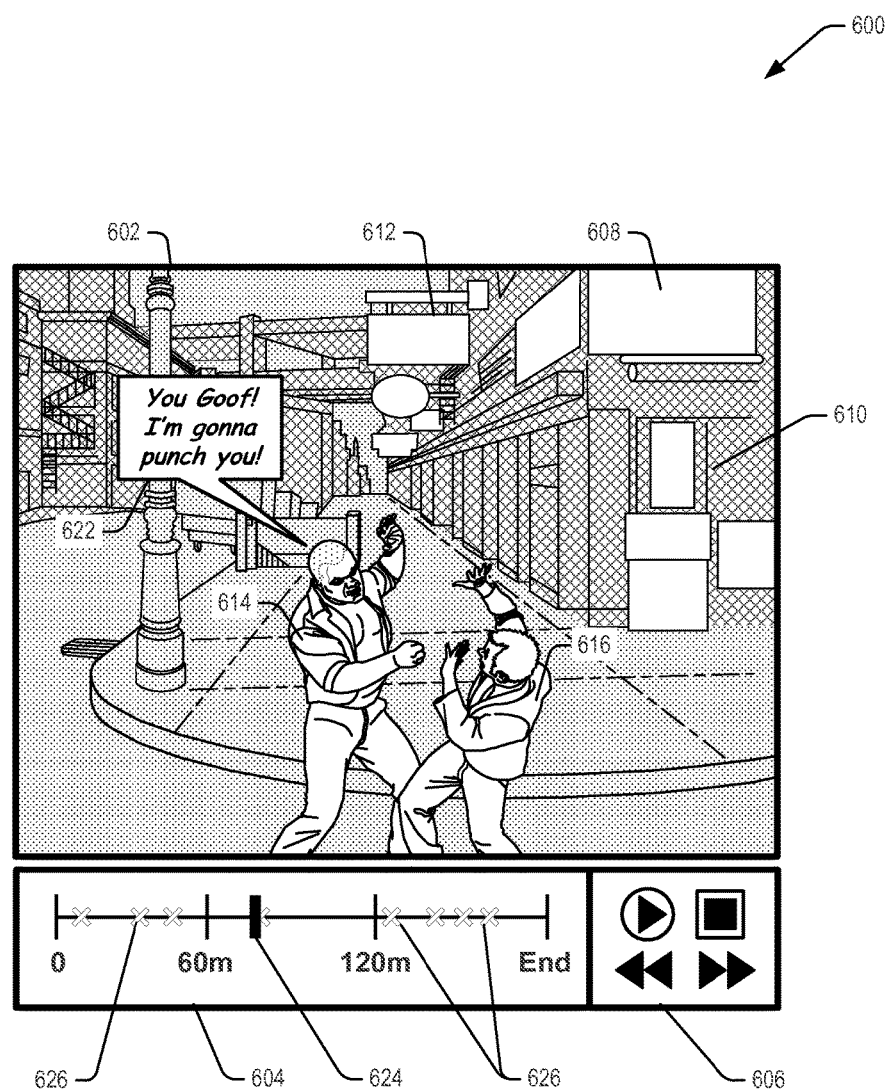
FIG. 6 is an example user interface depicting techniques relating to management of content versions as described herein, according to at least one example.

The scene may depict the two men 514, 516 as they are currently engaged in a fight scene (e.g., a violent sequence). This may be evident by the positioning of the two men 514, 516 relative to each other, the presence of a knife 518, the presence of blood 520, and the presence of words 522. In some examples, any of the signs 508-512, the positioning of the men 514, 516, the knife 518, the blood 520, the words 522, and any other verbal or visual aspect of the scene may act as visual and/or verbal indicators. In this manner, depending on user preferences, the content version management engine 102 may identify the segment corresponding to his scene, including one or more frames before this frame and/or one or more frames after this frame, as a segment to be modified. A modified version of this scene is illustrated in FIG. 6.

The playback control portion 506 may be configured with any suitable combination of buttons, toggles, and the like to enable playback control of the movie. The timeline portion 504 may include a slide bar 524 which may indicate the current location of the displayed scene relative to the entire movie. The timeline portion 504 may also include one or more content indicators 526. The content indicators 526 may correspond to locations in the movie where alternate content (e.g., alternate segments) may be introduced. For example, the slide bar 524 partially covers one of the content indicators 526. This may indicate that the currently displayed scene is one in which alternate content may be introduced. The alternate content may have been previously generated by a production studio that produced the movie, may be selected from generic content, may be an advertisement, may be a modified version of the scene using techniques described herein (e.g., removal and/or on-screen censoring of certain content). The content indicators 526 may be referenced in addition to the verbal and visual indicators discussed above. In some examples, the content indicators 526 may be the only indicators that are used to determine when alternate content can be introduced.

In some examples, the user interface 500 is used by a curator to insert the content indicators 526. For example, as a curator reviews the movie, whether during production or afterwards, the curator may jump from frame to frame using the buttons in the playback control portion 506 or by sliding the slide bar 524 to locate scenes that may be modified. Once a scene is located, the curator may access functionality to enable the curator to insert a content indicator 526 along the timeline portion 504 and insert a note associated with the content indicator 526. In some examples, the functionality of viewing the user interface 500, inserting the content indicators 526, inserting notes along with the content indicators 526, and associating the content indicators 526 and notes with the movie, may be provided to a user device via one or more application programming interfaces (API). In this manner, a curator may utilize the API provided by the content service 204 to interact with the content indicators 526. The notes may indicate additional details about the scene identified by the content indicator. The notes may also reference certain other alternate scenes that can be used in place of the identified scene. For example, the notes may include a table that includes a listing of alternate scenes, describes details about each alternate scene (e.g., identify what is removed or altered compared to the identified scene), identify a likely "rating" for each scene, and any other information that may relevant to determining an alternate scene.

In some examples, a content item may be analyzed using the techniques described herein to identify inappropriate content. In some examples, the content item may be analyzed outside of a user experience where the content item is being enjoyed. For example, the content service 204 may be configured to analyze the content item to identify content (e.g., the scene in the display portion 502) that may inappropriate. In some examples, the appropriateness of the content is determined based at least in categories of content (e.g., violence, sexual situations, language, etc.). When a scene that includes such inappropriate content is identified (e.g., the scene in the display portion 502), a digital overlay may be placed over the inappropriate content for the duration of its presentation. In some examples, the digital overlay may include a cartoon shape or drawing (e.g., a flower, a caricature, a gaggle of geese, a herd of rabbits, or any other suitable drawing). In some examples, the drawing may be comical and/or suited for younger, less mature audiences. In some examples, the digital overlay may include an overlay that blends in with the underlying content or attempts to mimic would look if appropriate. For example, an overlay of clothing may be placed over a portion of a body or an overlay over a violent scene may effectively cover the blood associated with the violent scene, but otherwise blend in with the surroundings. In some examples, the digital overlay may include advertisements or product placements. For example, any of the signs (e.g., the graphic sign 510) may be adjusted to include an advertisement.

In some examples, alternate segments of content items may include commercial segments. The commercial segments may be customized to users of user devices. For example, the commercial segments may be selected from a set of commercial segments based on user information (e.g., information located within the user information data store 240) provided by, or collected from, the users. In one example, first user information may include a first purchase history of a first user, while second user information may include a second purchase history of a second user. Similarly as how user preferences may be accessed, the purchase histories of the two users can be accessed to select customized commercials for each user while the two users are enjoying the same versions or different versions of a content item. For example, the first user (via a first user device) may receive a commercial for mountain bikes and the second user (via a user device) may receive a commercial for books. The customized commercials (e.g., commercial segments) may be presented to the users during a scheduled break (e.g., "commercial break") or as alternate segments in the place of identified segments.

In some examples,

Turning now to FIG. 6, in this figure is illustrated an example user interface 600 for implementing techniques relating to management of content versions as described herein. The user interface 600 may display a modified version of the scene displayed in the user interface 500. Thus, the user interface 600 may be identical to the user interface 500 except that the scene in display portion 602 has been modified. The modifications may have been made in accordance with user preferences. For example, a user preference may correspond to a rating category and the verbal and/or visual indicators identified in the scene may indicate content falling outside of the rating category. Thus, signs 608-612, along with other signs, have been modified to remove "adult-related content" that may fall outside of the rating category. For the same reasons, the scene of men 614, 616 may be modified to remove the knife 518 and the blood 520. Similarly, the words 522 may have been modified from "You !*@$!! I'm gonnna !*@$!! you!," which may have included objectionable words, phrases, or meaning, to read "You Goof! I'm gonna punch you!" In some examples, the modification of the words 522 may correspond to other modifications in the modified scene. For example, the words 522 corresponded to a more violent scene (e.g., the man 514 attempting (and possibly succeeding) to harm the man 516 with the knife 518) compared to the scene in the display portion 602 which now correspond to what appears to be a fist fight between the two men 614, 616.

In the alternative of the ratings category, or in addition to it, the user preferences may reference user-defined modifications to be made to all content. For example, such modifications may include removal or modification of all "adult-related content," "knives," "blood," certain words or phrases, certain words or phrases that have certain meanings, certain scenes, and the like. Such modifications may be identified and made in accordance with the techniques described herein.

Figure 7:
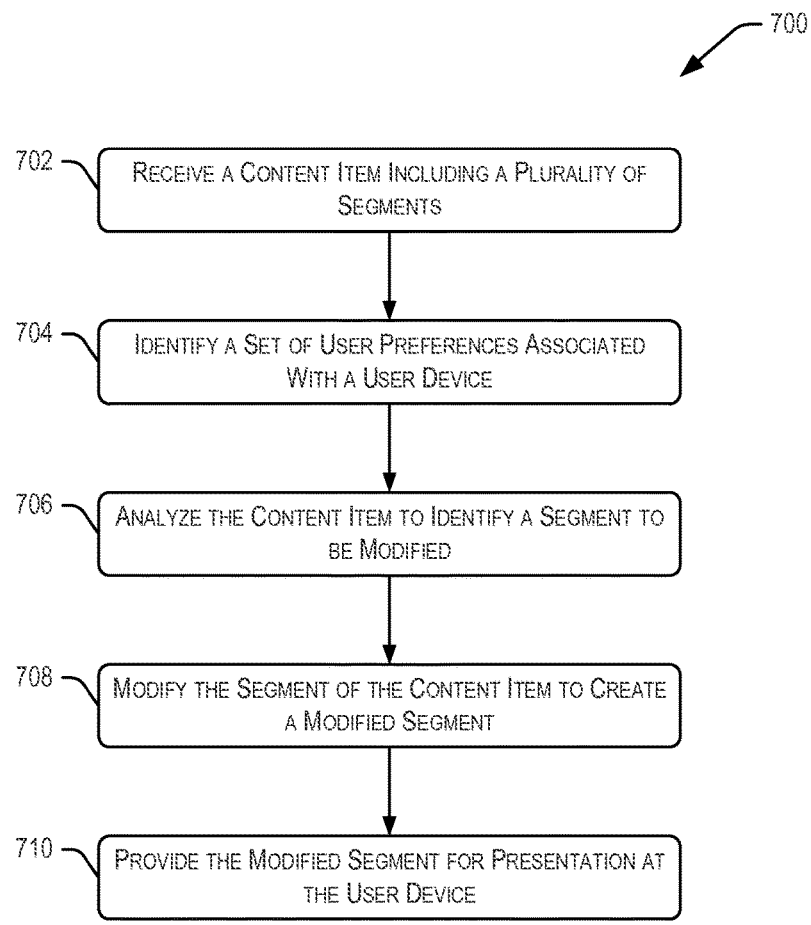
FIG. 7 is a flow diagram depicting example acts for implementing techniques relating to management of content versions as described herein, according to at least one example.
Figure 8:
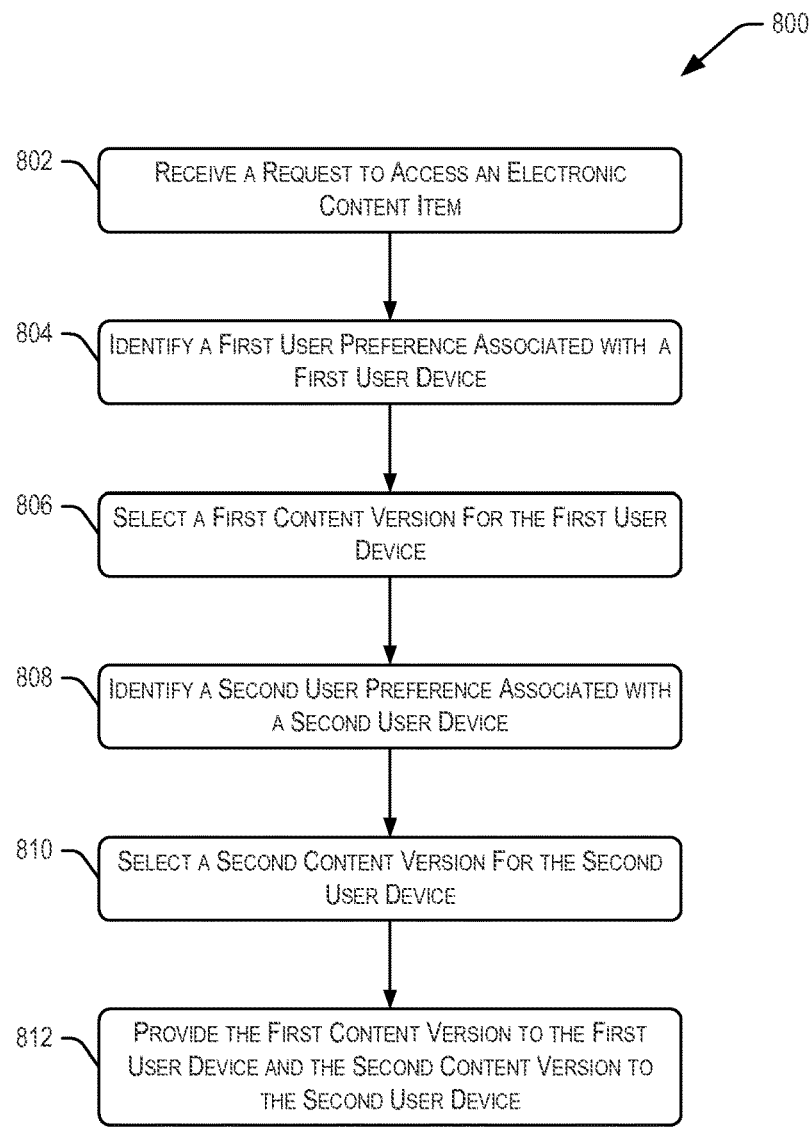
FIG. 8 is a flow diagram depicting example acts for implementing techniques relating to management of content versions as described herein, according to at least one example.
Figure 9:
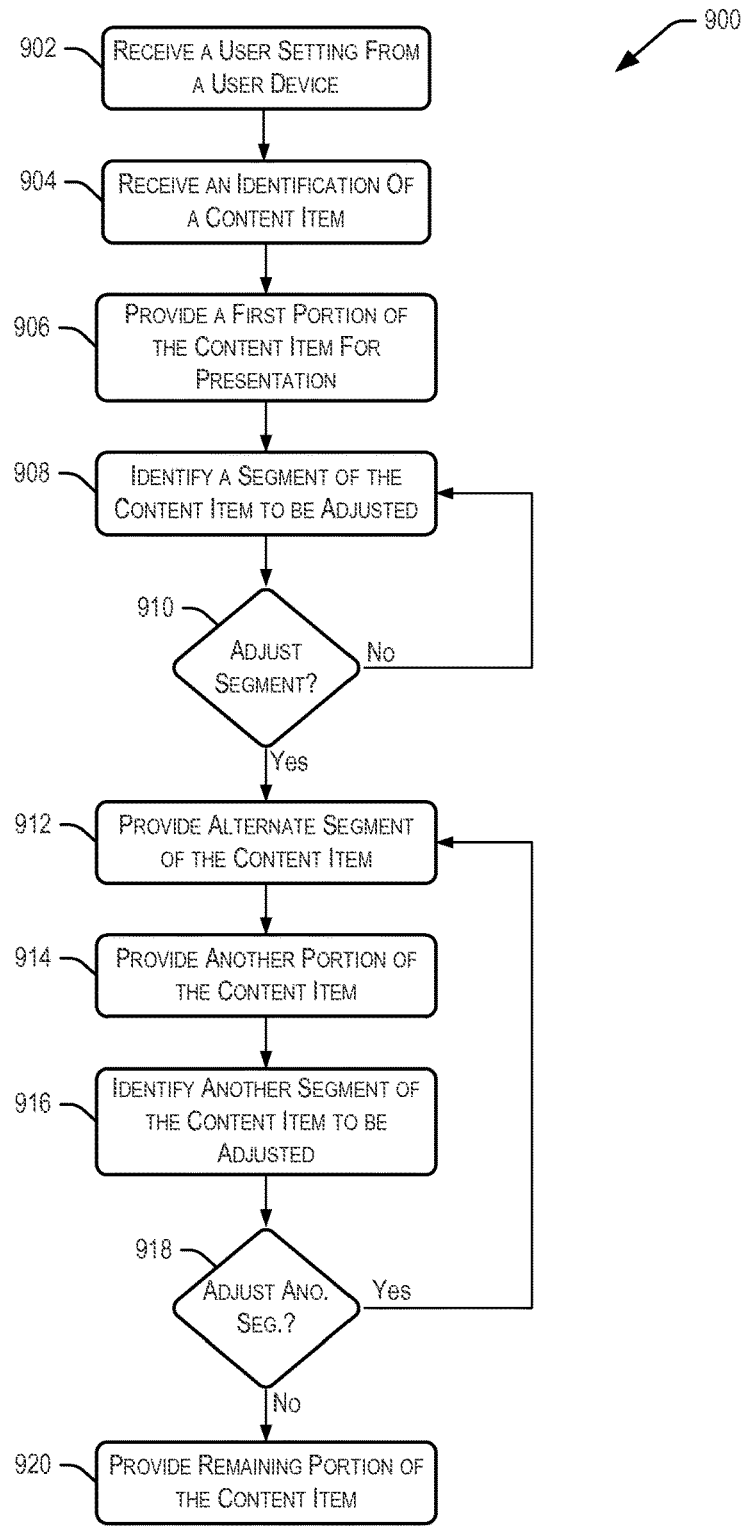
FIG. 9 is a flow diagram depicting example acts for implementing techniques relating to management of content versions as described herein, according to at least one example.

FIGS. 7, 8, and 9 illustrate example flow diagrams showing respective processes 700, 800, and 900, as described herein. These processes 700, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 7 depicts the process 700 including example acts or techniques relating to managing content versions in accordance with at least one example. The content version management engine 102 (FIG. 2), whether embodied in the content service 204 (FIG. 2) or the local host device 202 (FIG. 2), may perform the process 700 of FIG. 7. The process 700 begins at 702 by receiving a content item including a plurality of segments. In some examples, this may be performed by the content delivery component 314 (FIG. 3). Receiving the content item may include receiving the content item from a curator, a third-party content management service, a user device, or any other suitable component of the content service 204 or the architecture 200. In some examples, the plurality of segments may be received sequentially. When the content item is a video file, each segment may correspond to one or more frames of the video file. In some examples, each segment may be of equal or unequal length.

At 704, the process 700 identifies a set of user preferences associated with a user device. In some examples, this may be performed by the user preference management component 302. Identifying the set of user preferences may include receiving the set of user preferences from the user device, accessing the set of user preferences in a user profile for a user of the user device, receiving the set of user preferences along with the content item, and in any other suitable fashion. The set of user preferences may identify at least one modification to be made to the content item. In some examples, the set of user preferences include individual user preferences which each identify particular modifications to be made to content items. In some examples, the particular modifications are specific to the content item or are generic to all content items.

At 706, the process 700 analyzes the content item to identify a segment to be modified. In some examples, this may be performed by at least one of the content indicator component 306 (FIG. 3), the visual indicator component 308 (FIG. 3), or the verbal indicator component 310 (FIG. 3). Analyzing the content item may include identifying a content indicator associated with the segment, identifying a visual indicator included in a visible portion of the content item, or identifying a verbal indicator included in an audio portion of the content item. The visible portion may be a portion that a user would see if the content item were playable. In some examples, the audio portion is a portion that the user would hear if the content item were playable. In some examples, the content indicator may be associated with the content by a curator or other authorized user.

At 708, the process 700 modifies the segment of the content item to create a modified segment. In some examples, this may be performed by the content modification component 312 (FIG. 3). Modifying the segment may include removing a frame of the content item and replacing the frame with an alternate frame. In some examples, modifying the segment may include removing a plurality of frames and replacing the plurality of frames with one or more alternate frames. In some examples, the modified segment is of equal length to the segment. In some examples, the modified segment is longer than or shorter than the segment. In some examples, modifying the segment to create the modified segment may include removing visible content and/or verbal content from the segment. In some examples, the removed content is replaced with different content. For example, an offensive word may be replaced with a different word, or an offensive image may be replaced with a less offensive image. In some examples, the offensive words and offensive images are simply censored (e.g., by bleeping out the word and covering the offensive image with a digital overlay).

At 710, the process 700 provides the modified segment for presentation at the user device. In some examples, this may be performed by the content delivery component 314. Providing the modified segment may include providing the modified segment to a local host device to transfer the modified segment to the user device. In some examples, providing the modified segment may include transmitting the modified segment to the user device. The user device may receive the modified segment within an application running on the user device.

FIG. 8 depicts the process 800 including example acts or techniques relating to managing content versions in accordance with at least one example. The content version management engine 102 (FIG. 2), whether embodied in the content service 204 (FIG. 2) or the local host device 202 (FIG. 2), may perform the process 800 of FIG. 8. The process 800 begins at 802 by receiving a request to access an electronic content item. In some examples, this may be performed by the content delivery component 314 (FIG. 3). The request may be received from a first user device of a plurality of user devices. In some examples, the request may be in response to a user using the first user device to search for the content item in a menu or catalog associated with the content service 204. In some examples, at least some of the plurality of user devices are connected to a network.

At 804, the process 800 identifies a first user preference associated with a first user device. In some examples, this may be performed by the user preference management component 302 (FIG. 3). In some examples, the first set of user preferences may identify a first set of adjustments to be applied to the electronic content item. For example, the first set of adjustments may indicate that the certain types of content in the electronic content item be removed, censored, and/or adjusted. In some examples, at least one adjustment of the first set of adjustments is defined by the first user.

At 806, the process 800 selects a first content version for the first user device. In some examples, this may be performed by the content modification component 312 (FIG. 3). Selecting the first content version may include selecting the first content version based on the first user preference. In some examples, the first content version is selected from a set of content versions The first content version may be a first content version because it differs in some respect from the electronic content item. In some examples, selecting the first content version may include modifying the electronic content item in accordance with the first user preference to create the first content version.

At 808, the process 800 identifies a second user preference associated with a second user device. In some examples, this may be performed by the user preference management component 302. In some examples, the second user preference may identify a second set of adjustments to be applied to the electronic content item. For example, the second set of adjustments may indicate that the certain types of content in the electronic content item be removed, censored, and/or adjusted. In some examples, at least one adjustment of the second set of adjustments is defined by at least one of the first user or the second user.

At 810, the process 800 selects a second content version for the second user device. In some examples, this may be performed by the content modification component 312. Selecting the second content version may include selecting the second content version based on the second user preference. In some examples, the second content version is selected from a set of content versions. The second content version may be a second content version because it differs in some respect from the electronic content item and the first content version. In some examples, selecting the second content version may include modifying the electronic content item in accordance with the second user preference to create the second content version. In some examples, the second content version may be distinct from the first content version.

At 812, the process 800 provides the first content version to the first user device and the second content version to the second user device. In some examples, this may be performed by the content delivery component 314. Providing the first content version and the second content version may include providing such that at least a portion of first content of the first content version and at least a portion of second content of the second content version may be displayed substantially simultaneously on the first user device and on the second user device. In some examples, the portion of first content of the first content version comprises a first adjusted segment of the electronic content item that is determined based at least in part on the first set of adjustments. In some examples, the portion of second content of the second content version comprises a second adjusted segment of the electronic content item that is determined based at least in part on the second set of adjustments. The first adjusted segment may be distinct from the second adjusted segment. In some examples, the first set of adjustments and the second set of adjustments comprise at least one of removal of a multi-frame segment of a scene of the electronic content item and replacement of the multi-frame segment of the scene with an adjusted multi-frame segment of the scene, removal of an audio segment of the scene and replacement of the audio segment of the scene with an adjusted audio segment of the scene, or adjustment of an image object in at least one frame of the scene.

FIG. 9 depicts the process 900 including example acts or techniques relating to managing content versions in accordance with at least one example. The content version management engine 102 (FIG. 2), whether embodied in the content service 204 (FIG. 2) or the local host device 202 (FIG. 2), may perform the process 900 of FIG. 9. The process 900 begins at 902 by receiving a user setting from a user device. In some examples, this may be performed by the user preference management component 302 (FIG. 3).

At 904, the process 900 receives an identification of a content item. In some examples, this may be performed by the content delivery component 314 (FIG. 3). The content item may include a plurality of segments. In some examples, the identification of the content item may be received from a curator, accessed from memory of the content service 204, or received from the content service 204. In some examples, receiving the identification may include receiving a selection of the content item. The selection may be received from the user device. In some examples, receiving the identification may include receiving the entirety of the content item.

At 906, the process 900 provides a first portion of the content item for presentation. In some examples, this may be performed by the content delivery component 314. Providing the first portion may include providing the first portion for presentation at the user device. In some examples, providing the first portion may include commencing a stream including the first portion or beginning a download including the first portion. In some examples, the stream or download has already been commenced when the first portion is provided. In some examples, the providing is in response to receiving the first portion from the content service 204. In some examples providing the first portion includes providing the first portion to a first user device and to a second user device over the same network.

At 908, the process 900 identifies a segment of the content item to be adjusted. In some examples, this may be performed by at least one of the content indicator component 306 (FIG. 3), the visual indicator component 308 (FIG. 3), or the verbal indicator component 310 (FIG. 3). Identifying the segment may include analyzing the first portion and a subsequent portion to identify the segment. Thus, in some examples, the segment may be identified subsequent to the first portion being provided for presentation. In some examples, identifying the segment of the content item includes identifying the segment of the content item to be adjusted in accordance with the user setting. In some examples, the user setting may indicate how to adjust the segment. In some examples, identifying the segment of the content item may include identifying a content indicator associated with the segment, identifying a visual indicator included in a visible portion of the content item, or identifying a verbal indicator included in an audio portion of the content item.

At 910, the process 900 determines whether to adjust the segment identified at 908. In some examples, this may be performed by the content modification component 312 (FIG. 3). Determining whether to adjust may include comparing the indicators used to identify the segment with the available content. In some examples, even though a segment was identified based on an indicator, the segment may not be modifiable because a different user preference may indicate to not modify such segments. For example, there may not be an appropriate alternate segment to replace the segment. In some examples, the segment may not be adjusted if doing so would require adjustments not permitted by a copyright holder, too drastic, or too long. If the answer at 910 is NO, the process 900 returns to 908 where a segment is identified. If the answer at 910 is YES, the process 900 continues to 912.

At 912, the process 900 provides an alternate segment of the content item. In some examples, this may be performed by the content modification component 312 and/or the content delivery component 314. Providing the alternate segment may include providing the alternate segment when the content item is first identified, when the stream commences, or when the download starts. In some examples, the alternate segment is received from the content service 204 is response to a request to receive the alternate segment. The request may be made prior to providing the alternate segment. In some examples, providing the alternate segment may include providing the alternate segment to the user device. In some examples, providing the alternate segment may include generating the alternate segment in accordance with the user setting. In some examples, a first alternate segment is provided to a first user device based on a first user setting and a second alternate segment is provided to a second user device based on a second user setting.

At 914, the process 900 provides another portion of the content item. In some examples, this may be performed by the content delivery component 314. Providing the another portion of the content item may include providing the another portion of the content item to the user device. In some examples, the another portion of the content item is provided to a first user device and a second user device.

At 916, the process 900 identifies another segment of the content item to be adjusted. In some examples, this may be performed by at least one of the content indicator component 306, the visual indicator component 308, or the verbal indicator component 310. In some examples, identifying the another segment may be determined in a manner similar to 908 where the segment was identified.

At 918, the process 900 determines whether to adjust the another segment. In some examples, this may be performed by the content modification component 312. Determining whether to adjust may include comparing the indicators used to identify the another segment with the available content. In some examples, even though the another segment was identified based on an indicator, the another segment may not be modifiable because a different user preference may indicate to not modify such segments. For example, there may not be an appropriate alternate segment to replace the another segment. In some examples, the another segment may not be adjusted if doing so would require adjustments not permitted by a copyright holder, too drastic, or too long. If the answer at 918 is YES, the process 900 returns to 912 where an alternate segment is provided. If the answer at 918 is NO, the process 900 continues to 920 where a remaining portion of the content item is provided.

At 920, the process 900 provides the remaining portion of the content item. In some examples, this may be performed by the content delivery component 314. Providing the remaining portion of the content item may include providing the remaining portion to a first user device and a second user device. In some examples, the remaining portion may be capable of being provided because the another segments have already been identified. In other words, the identifying may take place prior to the providing for display. In this manner, the content version management engine 102 may scan the content item ahead of portions of the content item being provided to the user device. During such scans, it can be determined whether modifications should be made and alternate segments added in the stream or download. In this manner, the alternate segments may be generated prior to being displayed, may be received prior to being displayed, may be provided with earlier-provided content and arranged prior to being displayed, and other suitable combinations. In some examples, the process 900 may return back to 908 to identify a segment of the content item to be adjusted. In some examples, the process 900 may be performed for each user device such that the adjusted segments are customized to each of the user devices and/or users.

Figure 10:
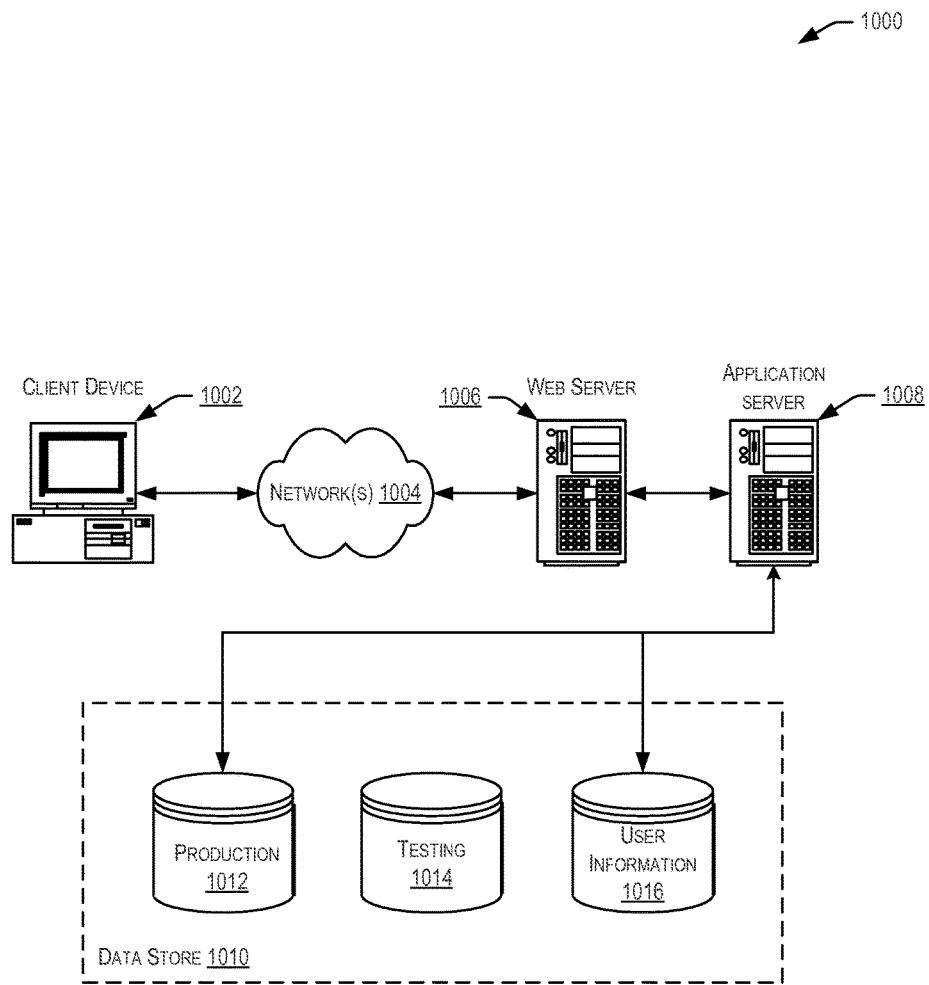
FIG. 10 is an example schematic environment for implementing techniques relating to management of content versions as described herein, according to at least one example.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z. or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of customizing content items in accordance with user preferences, the method comprising:
receiving, by a local host computing device, content item including a plurality of segments;

identifying, by the local host computing device, a first set of user preferences associated with a first user device that is in network communication with the local host computing device, the first set of user preferences at least identifying a first modification to be applied to the content item;

identifying, by the local host computing device, a second set of user preferences associated with a second user device that is in network communication with the local host computing device, the second set of user preferences at least identifying a second modification to be applied to the content item;

analyzing, by the local host computing device, the content item to identify a segment of the plurality of segments of the content item to be modified, the segment identified by at least one of identifying a content indicator, identifying a visual indicator, or identifying a verbal indicator;

modifying, by the local host computing device, the segment of the content item based on the first modification and the second modification to create respectively, a first modified segment and a second modified segment; and providing, by the local host computing device, at least the first modified segment and the second modified segment for substantially simultaneous presentation, respectively, at the first user device and the second user device.

2. The computer-implemented method of claim 1, wherein the content item comprises a plurality of content indicators, individual content indicators of the plurality of content indicators identifying individual segments of the content item that can be modified.

3. The computer-implemented method of claim 2, wherein the segment is identified by identifying the content indicator from among the plurality of content indicators, and wherein modifying the segment of the content item to create the first modified segment includes:

removing the segment from the content item, the segment comprising a first scene of the content item; and replacing the segment with the first modified segment, the first modified segment comprising a second scene of the content item that is distinct from the first scene.

4. The computer-implemented method of claim 2, wherein the plurality of content indicators are added to the content item by a curator using an indicator creation component.

5. The computer-implemented method of claim 1, wherein identifying the segment by identifying the visual indicator comprises analyzing a plurality of frames of the content item using an image processing technique to identify the visual indicator within at least one of the frames of the plurality of frames, the visual indicator corresponding to the first modification identified by the first set of user preferences, and the segment comprising the plurality of frames, and wherein modifying the segment to create the first modified segment comprises removing the at least one frame that includes the visual indicator.

6. The computer-implemented method of claim 5, wherein the visual indicator comprises an image object, and wherein modifying the segment IQ create the first modified segment further comprises replacing the at least one frame with at least one adjusted frame, the at least one adjusted frame comprising an adjusted image object.

7. The computer-implemented method of claim 1, wherein identifying the segment by identifying the verbal indicator comprises analyzing an audio segment of the content item corresponding to the segment using a speech recognition technique to identify the verbal indicator within the audio segment, the verbal indicator corresponding to the first modification identified by the first set of user preferences, and wherein modifying the segment to create the first modified segment comprises removing a portion of the audio segment including the verbal indicator from the segment.

8. The computer-implemented method of claim 7, wherein the verbal indicator comprises one or more sounds, and wherein modifying the segment to create the first modified segment further comprises replacing the portion of the audio segment with at least one adjusted portion, the at least one adjusted portion comprising one or more adjusted sounds.

9. The computer-implemented method of claim 1, wherein each of the first modified segment and the second modified segment comprises a commercial segment.

10. One or more computer-readable storage devices for storing computer-executable instructions that, when executed by one or more computer systems, configure the one or more computer systems to perform operations to customize content items in accordance with user preferences, the operations comprising:

receiving, by a local host computing device, a content item including a plurality of segments;

identifying, by the local host computing device, a first set of user preferences associated with a first user device that is in network communication with local host computing device, the first set of user preferences at least identifying a first modification to be applied to the content item;

identifying, by the local host computing device, a second set of user preferences associated with a second user device that is in network communication with the local host computing device, the second set of user preferences at least identifying a second modification to be applied to the content item;

analyzing, by the local host computing device, the content item to identify a segment of the plurality of segments of the content item to be modified, the segment identified by at least one of identifying a content indicator, identifying a visual indicator, or identifying a verbal indicator;

modifying, by the local host computing device, the segment of the content item based on the first modification and the second modification to create respectively, a first modified segment and a second modified segment; and providing, by the local host computing device, at least the first modified segment and the second modified segment for substantially simultaneous presentation, respectively, at the first user device and the second user device.

11. The one or more computer-readable storage devices of claim 10, wherein the content item comprises a plurality of content indicators, individual content indicators of the plurality of content indicators identifying individual segments of the content item that can be modified.

12. The one or more computer-readable storage devices of claim 11, wherein the segment is identified by identifying the content indicator from among the plurality of content indicators, and wherein modifying the segment of the content item to create the second modified segment includes:

removing the segment from the content item, the segment comprising a first scene of the content item; and replacing the segment with the second modified segment, the second modified segment comprising a second scene of the content item that is distinct from the first scene.

13. The one or more computer-readable storage devices of claim 11, wherein the plurality of content indicators are added to the content item by a curator using an indicator creation component.

14. The one or more computer-readable storage devices of claim 10, wherein identifying the segment by identifying the visual indicator comprises analyzing a plurality of frames of the content item using an image processing technique to identify the visual indicator within at least one of the frames of the plurality of frames, the visual indicator corresponding to the second modification identified by the second set of user preferences, and the segment comprising the plurality of frames, and wherein modifying the segment to create the second segment comprises removing the at least one frame that includes the visual indicator.

15. A host device for customizing content items in accordance with user preferences, the host device comprising:
   a memory configured to store computer-executable instructions; and
   one or more processors configured to access the memory and execute the computer-executable instructions to at least:
      receive a content item including a plurality of segments;
      identify a first set of user preferences associated with a first user device that is in network communication with the host device, the first set of user preferences at least identifying a modification to be applied to the content item;
      identify a second set of user preferences associated with a second user device that is in network communication with the host device, the second set of user preferences at least identifying a second modification to be applied to the content item;
      analyze the content item to identify a segment of the plurality of segments of the content item to be modified, the segment identified by at least one of identifying a content indicator, identifying a visual indicator, or identifying a verbal indicator;
      modify the segment of the content item based on the first modification and the second modification to create, respectively, a first modified segment and a second modified segment; and
      provide at least the first modified segment and the second modified segment for substantially simultaneous presentation, respectively, at the first user device and the second user device.

16. The host device of claim 15, wherein identifying the segment by identifying the verbal indicator comprises analyzing an audio segment of the content item corresponding to the segment using a speech recognition technique to identify the verbal indicator within the audio segment, the verbal indicator corresponding to the first modification identified by the first set of user preferences, and wherein modifying the segment to create the first modified segment comprises removing a portion of the audio segment including the verbal indicator from the segment.

17. The host device of claim 16, wherein the verbal indicator comprises one or more sounds, and wherein modifying the segment to create the first modified further comprises replacing the portion of the audio segment with at least one adjusted portion, the at least one adjusted portion comprising one or more adjusted sounds.

18. The host device of claim 15, wherein the content item comprises a plurality of content indicators, individual content indicators of the plurality of content indicators identifying individual segments of the content item that can be modified.

* * * * *

UNITED STATES PATENT AND TRADEMARK OFFICE
CERTIFICATE OF CORRECTION

PATENT NO. : 10,088,983 B1
APPLICATION NO. : 14/630311
DATED : October 2, 2018
INVENTOR(S) : Fareed Adib Qaddoura and Thomas Bruno Mader It is certified that error appears in the above-identified patent and that said Letters Patent is hereby corrected as shown below:

Column 26, Line 66, Claim 1:
Delete: "Receiving, by a local host computing device, content item"
Insert: --Receiving, by a focal host computing device, a content item--

Column 27, Line 61, Claim 6:
Delete: "wherein modifying the segment IQ create the first modified"
Insert: --wherein modifying the segment to create the first modified--

Signed and Sealed this
Twenty-fifth Day of December, 2018

Andrei Iancu
*Director of the United States Patent and Trademark Office*